US012790929B1

(12) United States Patent
Khan et al.

(10) Patent No.: US 12,790,929 B1
(45) Date of Patent: Nov. 10, 2026

(54) THERMOCHEMICAL CYCLING FOR THERMAL SHOCKING OF SUBSURFACE FORMATIONS

(71) Applicants: Saudi Arabian Oil Company, Dhahran (SA); King Fahd University of Petroleum and Minerals, Dhahran (SA)

(72) Inventors: Fahad Khan, Dhahran (SA); Mohamed Ahmed Nasr Aldeen Mahmoud, Dhahran (SA); Arshad Raza, Dhahran (SA); Murtadha J. AlTammar, Dhahran (SA); Muhammad Shahzad Kamal, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/406,337

(22) Filed: Dec. 2, 2025

(51) Int. Cl.
*E21B 43/263* (2006.01)
*C09K 8/592* (2006.01)
*C09K 8/66* (2006.01)

(52) U.S. Cl.
CPC ............ *E21B 43/263* (2013.01); *C09K 8/592* (2013.01); *C09K 8/665* (2013.01)

(58) Field of Classification Search
CPC ........ E21B 43/263; C09K 8/592; C09K 8/665
(Continued)

(56) References Cited

U.S. PATENT DOCUMENTS 4,589,491 A 5/1986 Perkins
4,660,643 A 4/1987 Perkins
(Continued)

OTHER PUBLICATIONS

Almarri et al., "Numerical feasibility of near-wellbore cooling as a novel method for reducing breakdown pressure in hydraulic fracturing", Journal of Natural Gas Science and Engineering, vol. 102, 104549, 12 pages, 2022.
(Continued)

*Primary Examiner* — William D Hutton, Jr.
*Assistant Examiner* — Ashish K Varma
(74) *Attorney, Agent, or Firm* — Dinsmore & Shohl LLP

(57) ABSTRACT

A method of thermally shocking a subsurface formation may comprise introducing an endothermic fluid composition comprising a first aqueous solution and ammonium chloride into the subsurface formation via a wellbore fluidly connected to the subsurface formation; reacting the ammonium chloride with fluids of the subsurface formation, thereby decreasing a temperature of the subsurface formation, producing ammonia, and thermally shocking the subsurface formation, thereby inducing one or more fractures in the subsurface formation; introducing an exothermic fluid composition comprising a second aqueous solution, an ammonium-containing compound, and a nitrite-containing compound into the subsurface formation; and reacting the ammonium-containing compound and the nitrite-containing compound in the subsurface formation, thereby increasing the temperature of the subsurface formation, producing nitrogen, and inducing one or more additional fractures in the subsurface formation.

19 Claims, 6 Drawing Sheets

(58) Field of Classification Search
USPC .......................................................... 166/300
See application file for complete search history.

(56) References Cited

U.S. PATENT DOCUMENTS

| | | | | |
|---|---|---|---|---|
| 6,227,295 | B1 | 5/2001 | Mitchell et al. | |
| 9,644,137 | B2 * | 5/2017 | Dean | E21B 43/26 |
| 9,920,608 | B2 * | 3/2018 | van Oort | E21B 43/26 |
| 11,661,821 | B2 | 5/2023 | Toews et al. | |
| 11,866,639 | B2 * | 1/2024 | Chang | C09K 23/18 |
| 12,442,282 | B1 | 10/2025 | Khan et al. | |
| 2013/0126169 | A1 * | 5/2013 | Al-Nakhli | C09K 8/92 507/213 |
| 2023/0228155 | A1 | 7/2023 | Toews et al. | |

OTHER PUBLICATIONS

Altammar et al., "Application of Different Fluid Injection Methods to Reduce Breakdown Pressure", International Petroleum Technology Conference, IPTC-19589-MS, Jan. 13-15, 2000.
Briner et al., "Impact of Wellbore Orientation of Fracture Initiation Pressure in Maximum Tensile Stress Criterion Model for Tight Gas Field in the Sultanate of Oman", Society of Petroleum Engineers, SPE-175725-MS, 14 pages, Sep. 14-16, 2015.
Chavez et al., "Formation Breakdown Prediction for the Implementation of Hydraulic Fracturing on a HPHT Tight Gas eservoir in Oman", Society of Petroleum Engineers, SPE-164012, 8 pages, Jan. 28-30, 2013.
Dong et al., "Experimental Study on the Effect of Thermal Shock on Physical and Mechanical Properties of Limestone", Applied Sciences, vol. 13, 3649, 17 pages, Mar. 113, 2023.
Elwegaa et al., "The Effect of Thrmal Shocking with Nitrogen Gas on the Porosities, Permeabilities, and Rock Mechanical Properties of Unconventional Reservoirs", Energies, vol. 11, 2131, 16 pages, Aug. 15, 2018.
Enayatpour et al., "FreezeFrac Improves the Productivity of Gas Shales", Society of Petroleum Engineers, SPE 164482, 17 pages, Sep. 30-Oct. 2, 2013.
Enayatpour et al., "Thermal cooling to improve hydraulic fracturing efficiency and hydrocarbon production in shales", Journal of Natural Gas Science and Engineering, vol. 62, pp. 184-201, 2019.
Guler et al., "Thermal shock and freeze-thaw resistance of different types of carbonate rocks", International Journal of Rock Mechanics and Mining Sciences, vol. 137, 104545, 17 pages, 2021.
Han et al., "Reducing Breakdown Pressure in Hydraulic Fracturing: A Novel Cyclic Injection Procedure", American Rock Mechanics Association, ARMA22-0545, 7 pages, Jun. 26-29, 2022.
Im et al., "Long- and Short-Term Strategies for Estimation of Hydraulic Fracturing Cost Using Fuzzy Logic", Minerals, vol. 12, 715, 20 pages, Jun. 4, 2022.
Khan et al., "Application of Endothermic Fluids to Lower the Breakdown Pressure of Unconventional Reservoirs: Implications for Hydraulic Fracturing", ACS Omega, vol. 9, pp. 37253-37264, 2024.
Khan et al., "Labortory Demonstration of Geothermal Rock Cooling to Reduce Breakdown Pressure in Hydraulic Fracturing", Society of Petroleum Engineers, SPE-224657-MS, 12 pages, Apr. 21-23, 2025.
Khan et al., "Novel Emulion-Based Fracturing Fluid for In-Situ Thermal shock to Facilitate Hydraulic Fracturing in Unconventional Geothermal Reservoirs", Society of Petroleum Engineers, SPE-224942-MS, 9 pages, May 12-14, 2025.
Kolawole et al., "How will treatment parameters impact the optimization of hydraulic fracturing process in unconventional reservoirs? ", SN Applied Sciences, vol. 2:1865, 21 pages, 2020.
Li et al., "Thermal-shock-induced surface softening and conductivity evolution of hydraulic fracture in enhanced geothermal system", Geothermics, vol. 102, 102405, 12 pages, 2022.
Oldenburg, "Joule-Thomson cooling ue to CO2 injection into natural gas rservoirs", Energy Conversion & Management, vol. 48, pp. 1808-1815, 2007.
Oparin et al., "Impact of Local Stress Heterogeneity on Fracture Initiation in Unconventional Reservoirs: A Case Study from Saudi Arabia", Society of Petroleum Engineers, SPE-181617-MS, 18 pages, Sep. 26-28, 2016.
Safari et al., "Improved Recovery of Carbonate Reservoir by Optimizing Acidizing Strategy; Coupled Wellbore, Reservoir, and Geomechanical Analysis", Society of Petroleum Engineers, SPE-188683-MS, 18 pages, Nov. 13-16, 2017.
Salah et al., "Cyclic Injection Scheme to Reduce Breakdown Pressure in Hydraulic Fracturing Wells: Case Study", Society of Petroleum Engineers, SPE-216185-MS, 12 pages, Oct. 2-5, 2023.
Xue et al., "Effect of water-cooling shock on fracture initiation and morphology of high-temperature granite: Application of hydraulic fracturing to enhanced geothermal systems", Applied Energy, vol. 337, 120858, 21 pages, 2023.
Yang et al., "Laboratory investigation on cryogenic fracturing of hot dry rock under triaxial-confining stresses", Geothermics, vol. 79, pp. 46-60, 2019.
Zhang et al., "In-situ stresses, abnormal pore pressures and their impacts on the Triassic Xujiahe reservoirs in tectonically active western Sichuan basin", Marine and Petroleum Geology, vol. 122, 104708, 16 pages, 2020.
Zhu et al., "Eperimental investigation on physical and mechanical properties of thermal cycling granite by water cooling", Acta Geotechnica, vol. 15, pp. 1881-1893, 2020.
Zhu et al., "A prediction of breakdown pressure from damaged deviated well", IOP Conf. Series, Earth and Environmental Science, vol. 675, 012174, 7 pages, 2021.

* cited by examiner

THERMOCHEMICAL CYCLING FOR THERMAL SHOCKING OF SUBSURFACE FORMATIONS

FIELD

The present disclosure generally relates to endothermic fluid compositions as well as methods of utilizing the same. More particularly, embodiments herein relate to methods and compositions for thermally shocking a subsurface formation utilizing a repeatable introduction scheme of endothermic and exothermic fluid compositions, as detailed herein.

BACKGROUND

Unconventional reservoir rocks and geothermal reservoirs are typically characterized by very low permeability and porosity. To make cost-effective production from these reservoirs, unconventional means such as horizontal drilling and hydraulic fracturing are typically practiced. In hydraulic fracturing, also referred to as 'fracking', a fluid is pumped at high pressure into the subsurface formation, generating one or more elongated fractures in the subsurface formation that may be propped open by a subsequently placed proppant. These propped open fractures form a higher permeability conduit within the formation, enabling increasing recovery of fluids from the same.

However, during hydraulic fracturing, the formation breakdown pressure (pressure at which the first fractures begin to form) is of great importance and depends on geomechanical characteristics (strength and Poisson's ratio). As previously mentioned, typically great pressures and large amounts of injected fluid are needed to achieve initial formation breakdown, adding substantial cost and material needs to the process.

SUMMARY

Thus, continuously desired are alternative or supplemental methods to reduce the amount of fluid and/or pressure need to fracture subsurface formations. Embodiments herein fulfill the aforementioned need by providing compositions and methods for inducing thermal shock in the subsurface formation, thereby softening and/or forming one or more fractures in the same. The resultant softening and/or one or more fractures may operate to decrease a compressive strength and Poisson's ratio of the subsurface formation, thereby also decreasing the formation breakdown pressure. The net result is that the entire hydraulic fracturing operation may need to use less fluid and less pressure to adequately fracture the subsurface formation, thereby resulting in considerable cost and materials saving.

Particularly, in one more embodiments herein, endothermic and exothermic fluid compositions are provided that may contain endothermic and exothermic components, respectively, that rapidly decrease and increase in temperature, respectively, when reacted. Accordingly, by alternating introduction of the endothermic and exothermic fluid compositions the subsurface formation may be repeatedly thermally shocked by the endothermic fluid composition, resulting in pronounced decreases in breakdown pressure. Further, the exothermic fluid composition may itself release nitrogen gas which may operate to generate nitrogen pulses in the subsurface formation, thereby forming additional fractures in the subsurface formation that may be exploited by a subsequent endothermic fluid composition and/or hydraulic fracturing composition.

In accordance with one embodiment herein, a method of thermally shocking a subsurface formation may comprise introducing an endothermic fluid composition comprising a first aqueous solution and ammonium chloride into the subsurface formation via a wellbore fluidly connected to the subsurface formation; reacting the ammonium chloride with fluids of the subsurface formation, thereby decreasing a temperature of the subsurface formation, producing ammonia, and thermally shocking the subsurface formation, thereby inducing one or more fractures in the subsurface formation; introducing an exothermic fluid composition comprising a second aqueous solution, an ammonium-containing compound, and a nitrite-containing compound into the subsurface formation; and reacting the ammonium-containing compound and the nitrite-containing compound in the subsurface formation, thereby increasing the temperature of the subsurface formation, producing nitrogen, and inducing one or more additional fractures in the subsurface formation.

In accordance with another embodiment herein, a method of thermally shocking a subsurface formation may comprise introducing an exothermic fluid composition comprising an aqueous solution, an ammonium-containing compound, and a nitrite-containing compound into the subsurface formation via a wellbore fluidly connected to the subsurface formation; reacting the ammonium-containing compound and the nitrite-containing compound of the exothermic fluid composition in the subsurface formation, thereby increasing a temperature of the subsurface formation, producing nitrogen, and inducing one or more fractures in the subsurface formation; introducing an endothermic fluid composition comprising a second aqueous solution and ammonium chloride into the subsurface formation via the wellbore; reacting the ammonium chloride with fluids of the subsurface formation, thereby decreasing the temperature of the subsurface formation, producing ammonia, and thermally shocking the subsurface formation, thereby inducing one or more additional fractures in the subsurface formation; introducing a second exothermic fluid composition comprising the aqueous solution, the ammonium-containing compound, and the nitrite-containing compound into the subsurface formation; reacting the ammonium-containing compound and the nitrite-containing compound of the second exothermic fluid composition in the subsurface formation, thereby again increasing a temperature of the subsurface formation, producing additional nitrogen, and inducing one or more additional fractures in the subsurface formation; introducing a second endothermic fluid composition comprising the second aqueous solution and the ammonium chloride into the subsurface formation via the wellbore; and reacting the ammonium chloride of the second endothermic fluid composition with fluids of the subsurface formation, thereby again decreasing the temperature of the subsurface formation, producing additional ammonia, and again thermally shocking the subsurface formation thereby inducing one or more additional fractures in the subsurface formation.

BRIEF DESCRIPTION OF THE DRAWINGS

The following detailed description of specific embodiments of the present disclosure can be best understood when read in conjunction with the following drawings, where like structure is indicated with like reference numerals and in which.

Figure

Figure 1:
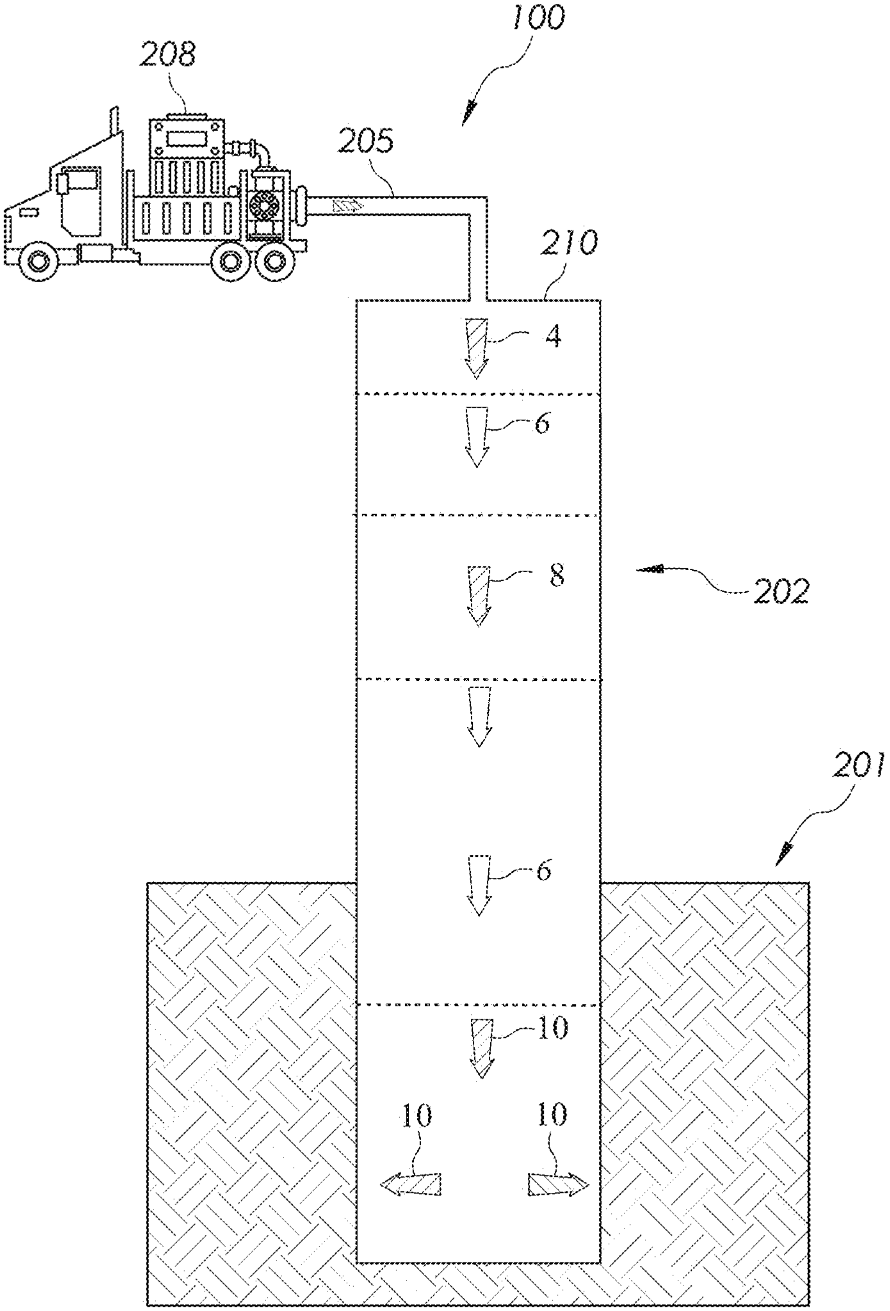
(FIG. 1 illustrates a system for thermally shocking a subsurface formation, according to embodiments herein, particularly illustrating the introduction of the exothermic fluid composition eventually followed by the endothermic fluid composition.

For the purpose of describing the simplified schematic illustrations and descriptions of the relevant figures, the numerous valves, temperature sensors, electronic controllers and the like that may be employed and well known to those of ordinary skill in the art of certain chemical processing operations and or hydraulic fracturing operations are not included. It should be understood that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

As previously stated, embodiments described herein generally relate to methods, compositions, and systems for producing fluids from subsurface formations. More particularly, embodiments herein relate to methods and compositions for thermally shocking a subsurface formation utilizing a repeatable introduction scheme of endothermic and exothermic fluid compositions, as detailed herein.

As used throughout this disclosure, the terms "downhole" and "uphole" may refer to a position within a wellbore relative to the surface, with uphole indicating direction or position closer to the surface and downhole referring to direction or position farther away from the surface.

As described in the present disclosure, a "subsurface formation" may refer to a body of rock that is sufficiently distinctive and continuous from the surrounding rock bodies that the body of the rock may be mapped as a distinct entity. A subsurface formation is, therefore, sufficiently homogenous to form a single identifiable unit containing similar properties throughout the subsurface formation, including, but not limited to, porosity and permeability.

As used throughout this disclosure, "thermal shock" may refer to a process a material undergoes upon experiencing an abrupt heat flux or temperature gradient change. Upon experiencing the same, the material undergoes significant thermal stress and strain, often causing material failure. The material failure may be observed in terms of cracks or loss of compressive or tensile strength in the material.

As used throughout this disclosure, "wellbore," may refer to a drilled hole or borehole extending from the surface of the Earth down to the subsurface formation, including the openhole or uncased portion. The wellbore may form a pathway capable of permitting fluids to traverse between the surface and the subsurface formation. The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

As used throughout this disclosure, a "wellbore wall" may refer to the interface through which fluid may transition between the subsurface formation and the interior of the wellbore. The wellbore wall may be unlined (that is, bare rock or formation) to permit such interaction with the subsurface formation or lined, such as by a tubular string, so as to prevent such interactions. The wellbore wall may also define the void volume of the wellbore.

Referring initially to FIG. 1, illustrated is a system 100 for thermally shocking a subsurface formation 201, such as by utilizing an endothermic fluid composition 4 and an exothermic fluid composition 10. The subsurface formation 201, as well as the subsurface fluids such as hydrocarbons therein, may have a temperature of greater than 30° C., such as from 30° C. to 50° C., from 50° C. to 80° C., from 80° C. to 100° C., from 100° C. to 120° C., from 120° C. to 130° C., from 130° C. to 150° C., from 150° C. to 175° C., from 175° C. to 200° C., from 200° C. to 250° C., or combinations of the previous ranges or smaller ranges therein, such as from 120° C. to 250° C. or from 30° C. to 250° C.

In one or more embodiments herein, the endothermic fluid composition 4 may comprise an aqueous solution and one or more components operable to form ammonia when reacted. For example, and in embodiments, the endothermic fluid composition 4 may comprise the aqueous solution and ammonium chloride. The endothermic fluid composition may also comprise components operable to encapsulate the ammonium chloride. For example, and in embodiments, the ammonium chloride may be encapsulated with an encapsulation material, which may have a matrix structure, a core-shell structure, or a combination of both. In some embodiments, matrix structure may include the ammonium chloride dispersed in an encapsulation material, such as beads, microparticles, or microspheres.

In some embodiments, the core/shell structure may include the ammonium chloride confined as one core by one shell or more of encapsulation material, such as microparticles or microcapsules. In some embodiments, the matrix structure or coreshell structure may include one or more natural polymers including starch, cellulose, gellan gum, chitosan, or dextrin. In some embodiments, the matrix structure or core-shell structure may include one or more synthetic polymers including polyester, polyurethane, polyurea, polyvinyl alcohol, polycaprolactone, polyamide, or polyacrylate. The ratio of the encapsulation material to the ammonium chloride may be in a range of 0.03:1 to 7:1 by volume, or 0.05:1 to 5:1, or 0.1:1 to 3:1, or 0.5:1 to 2:1. Both physical and chemical methods may be used to prepare the individualized encapsulated ammonium chloride particles. Physical methods may include extrusion, spray coating, or spray drying. Chemical methods may include interfacial confined polymerization, in situ polymerization, or interfacial polycondensation.

Additionally or alternatively, the endothermic fluid composition 4 may also comprise components operable to encapsulate the ammonium chloride and to crosslink the fluid, such as a polymer, a surface crosslinker, and/or a delayed crosslinker.

Embodiments herein may also utilize an endothermic booster fluid 8 preceding or following the endothermic fluid composition 4. The endothermic booster fluid 8 may comprise a hydroxide-containing compound, such as barium hydroxide or sodium hydroxide, as well as an aqueous solution, which may be similar or identical to the aqueous solution for the endothermic fluid composition 4. Additionally, the endothermic booster fluid 8 may itself comprise a polymer and a crosslinker, which may be similar or identical to polymer and crosslinker for the endothermic fluid composition 4. Alternatively, the hydroxide-containing compound may be incorporated into the endothermic fluid composition 4.

Further embodiments herein may also utilize a spacer fluid 6, which may comprise an aqueous solution, which may be similar or identical to the aqueous solution for the endothermic fluid composition 4. Additionally, the spacer fluid 6 may itself comprise a polymer and a crosslinker, which may be similar or identical to the polymer and crosslinker for the endothermic fluid composition 4.

In such embodiments including both the endothermic fluid composition 4 and the endothermic booster fluid 8 comprising barium hydroxide, the endothermic reaction may proceed according to Equations I and II below, wherein the ammonium chloride reacts primarily with the barium hydroxide but also to a lesser extent with the aqueous solution:

$$NH_4Cl\ (s) + H_2O\ (l) \longrightarrow NH_4^+\ (aq) + Cl^- + H_2O\ (l) \longrightarrow NH_4OH + HCl\ (l);$$

and $$NH_4Cl\ (s) + BaOH\ (aq) + NH_3^+\ (g) + BaCl\ (aq) + H_2O\ (l)$$

In such embodiments including both the endothermic fluid composition 4 and the endothermic booster fluid 8 comprising sodium hydroxide, the endothermic reaction may proceed according to Equations I and III below, wherein the ammonium chloride reacts primarily with the sodium hydroxide but also to a lesser extent with the aqueous solution:

$$NH_4Cl\ (s) + NaOH\ (aq) \longrightarrow NH_3^+\ (g) + NaCl\ (aq) + H_2O\ (l). \quad \text{(III)}$$

As shown in the examples hereinbelow, the reaction between ammonium chloride and water may generally be less endothermic than reactions between ammonium chloride and hydroxide containing compounds, such that it may be desired to optimize the endothermic fluid composition 4 towards the ammonium chloride and hydroxide containing compound reaction.

Further, sodium hydroxide may be preferable to barium hydroxide, and in particular barium hydroxide octahydrate, due at least to barium hydroxide's relatively low solubility in the aqueous solution as compared to sodium hydroxide. Particularly, it is contemplated that combinations of the endothermic fluid composition 4 and the endothermic booster fluid 8 comprising the barium hydroxide may not completely dissolve without the provision of a greater ratio of water. However, the provision of a greater ratio of water may also bias the endothermic fluid composition 4 towards the relatively less endothermic water and ammonium chloride reactions as compared to sodium hydroxide and ammonium chloride.

Accordingly, to bias the endothermic fluid composition 4 towards reactions between the sodium hydroxide and ammonium chloride, a molar ratio between the sodium hydroxide and the ammonium chloride, in the respective endothermic fluid composition 4 and the endothermic booster fluid 8, may be from 1:1 to 15:1 sodium hydroxide to ammonium chloride, such as from 1:1 to 2:1, from 2:1 to 5:1, from 5:1 to 10:1, from 10:1 to 12:1, from 12:1 to 15:1, or any combination of the previous ranges or smaller range therein, such as from 2:1 to 12:1 sodium hydroxide to ammonium chloride.

Further, a concentration of the ammonium chloride in the aqueous solution, i.e., in the endothermic fluid, may be from 0.1 Molar to 5 Molar, such as from 0.1 Molar to 0.4 Molar, from 0.4 Molar to 0.5 Molar, from 0.5 Molar to 0.6 Molar, from 0.6 Molar to 1 Molar, from 1 Molar to 5 Molar, or any combination of the previous ranges or smaller range therein, such as from 0.4 Molar to 0.6 Molar. Further yet, a concentration of the sodium hydroxide in the aqueous solution, i.e. in the endothermic fluid, may be from 0.1 Molar to 32 Molar, such as from 0.1 Molar to 0.5 Molar, from 0.5 Molar to 1 Molar, from 1 Molar to 2 Molar, from 2 Molar to 6 Molar, from 6 Molar to 10 Molar, from 10 Molar to 16 Molar, from 16 Molar to 32 Molar, or any combination of the previous ranges or smaller range therein, such as from 1 Molar to 6 Molar.

As previously stated, the endothermic fluid composition 4 may comprise an aqueous solution. The aqueous solution may comprise distilled water, deionized water, or tap water. In embodiments, the aqueous solution may additionally comprise additives or contaminants. For example, the aqueous solution may comprise freshwater, seawater, natural brine, synthetic brine, formation water, salt water, or combinations thereof.

As previously stated, the endothermic fluid composition 4 may comprise a polymer, a surface crosslinker, and a delayed crosslinker. The polymer may comprise guar, cellulose, or both, such as hydroxy propyl guar, carboxy methyl hydroxyl propyl guar (CMHPG), hydroxy propyl cellulose, carboxy methyl hydroxyl ethyl cellulose, and/or any other water soluble polymers are contemplated. The surface crosslinker may comprise borate, titanate, aluminate, or combinations thereof. The delayed crosslinker may comprise an organozirconium compound. For example, and in embodiments, the organozirconium compound may comprise a complex of zirconium and an organic, such as a zirconium polycarboxylate, a zirconium polyethyleneamine, a zirconium polyethyleneimine, a zirconium polyhydrazone, or combinations thereof.

In embodiments, the surface crosslinker and the delayed crosslinker may have two different crosslinking temperatures and crosslink breaking temperatures. For example, and in embodiments, the surface crosslinker may be configured to crosslink the polymer in the aqueous solution at ambient conditions and break at elevated temperatures, whereas the delayed crosslinker may be configured to crosslink the polymer in the aqueous solution somewhere between elevated temperatures and the temperature at which the surface crosslink breaks, and to itself break somewhere above the temperature at which the surface crosslink breaks.

Accordingly, the endothermic fluid composition may comprise a crosslinked aqueous solution comprising the aqueous solution and the polymer crosslinked with the surface crosslinker, wherein the ammonium chloride and the delayed crosslinker are encapsulated by the crosslinked aqueous solution. Further, in at least some embodiments, the crosslinked aqueous solution may be over-saturated with the ammonium chloride, wherein the endothermic fluid composition comprises ammonium chloride dissolved in the crosslinked aqueous solution and solid ammonium chloride suspended in the crosslinked aqueous solution.

As previously stated, in at least some embodiments the endothermic fluid composition may comprise an endothermic booster such as the hydroxide-containing compound as previously described. In at least these embodiments, the endothermic booster may not be encapsulated by the crosslinked aqueous solution. In other words, the endothermic booster may be added to the crosslinked aqueous solution after encapsulation of the ammonium chloride and the delayed crosslinker, such that the hydroxide-containing compound does not react with the ammonium chloride, such as the solid ammonium chloride suspended in the crosslinked aqueous solution, as in at least some embodiments.

Additionally, the endothermic fluid composition may also comprise a breaker operable to break down the polymer of the endothermic fluid composition after breakdown of the surface and delayed crosslinks. The breaker may comprise a persulfate, a peroxide, or both, such as but not limited to ammonium persulfate, sodium persulfate, or an alkali earth metal peroxide.

Also as previously stated, the systems 100 herein may additionally utilize an exothermic fluid composition 10 which may comprise a thermochemical component and an aqueous solution, which may be similar or identical to the aqueous solutions previously described. The thermochemical component may comprise a nitrite-containing compound and an ammonium-containing compound. The ammonium-containing compound may comprise ammonium chloride, ammonium bromide, ammonium nitrate, ammonium sulfate, ammonium carbonate, ammonium hydroxide, or combinations thereof. In embodiments, the nitrite-containing compound may comprise sodium nitrite, potassium nitrite, or combinations thereof. In embodiments, the thermochemical component may comprise sodium nitrite and ammonium chloride.

The exothermic fluid composition may comprise from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % of the thermochemical component as calculated by volume of the exothermic fluid composition.

As previously mentioned, the thermochemical component includes sodium nitrite. In embodiments, the exothermic fluid composition 10 may include from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % sodium nitrite as calculated by volume of the thermochemical component.

As previously mentioned, the thermochemical component includes ammonium nitrite. In embodiments, the exothermic fluid composition 10 may include from 30 to 70 vol. %, from 30 to 65 vol. %, from 30 to 60 vol. %, from 30 to 55 vol. %, from 30 to 52 vol. %, from 35 to 70 vol. %, from 35 to 65 vol. %, from 35 to 60 vol. %, from 35 to 55 vol. %, from 35 to 52 vol. %, from 40 to 70 vol. %, from 40 to 65 vol. %, from 40 to 60 vol. %, from 40 to 55 vol. %, from 40 to 52 vol. %, from 45 to 70 vol. %, from 45 to 65 vol. %, from 45 to 60 vol. %, from 45 to 55 vol. %, from 45 to 52 vol. %, from 48 to 70 vol. %, from 48 to 65 vol. %, from 48 to 60 vol. %, from 48 to 55 vol. %, from 48 to 52 vol. %, or approximately 50 vol. % ammonium chloride as calculated by volume of the thermochemical component. The thermochemical component may also further comprise at least one acid salt, the acid salt being acidic after being dissolved in a solvent. The acid salt may include $NaHCO_3$, $NaHSO_4$, $NaH_2PO_4$, $Na_2HPO_4$, or combinations thereof.

In embodiments, the exothermic fluid composition may further comprise a buffer. As used in the present disclosure, a "buffer" refers to an acid, a base, or a salt that tends to cause a solution to maintain a constant pH. The buffer may comprise acetic acid, citric acid, monopotassium phosphate, N-cyclohexyl-2-aminoethanesulfonic acid, or combinations thereof. The exothermic fluid composition may comprise from 10 to 40 vol. %, from 10 to 35 vol. %, from 10 to 30 vol. %, from 10 to 25 vol. %, from 15 to 40 vol. %, from 15 to 35 vol. %, from 15 to 30 vol. %, from 15 to 25 vol. %, from 20 to 40 vol. %, from 20 to 35 vol. %, from 20 to 25 vol. %, from 23 to 40 vol. %, from 23 to 35 vol. %, from 23 to 30 vol. %, from 23 to 25 vol. %, or approximately 24 vol. % buffer by volume of the exothermic fluid composition.

As previously stated, embodiments herein may utilize a spacer fluid 6, which may be introduced between any one of the endothermic fluid composition 4, the endothermic booster fluid 8, or the exothermic fluid composition 10. However, in at least some embodiments at least one of the spacer fluids utilized may be acidic in nature, i.e., may comprise the aqueous solution as well as an acid, such as, but not limited to hydrochloric acid. For example, and as explained in further detail herein, the acidic spacer fluid 6 may be introduced after the endothermic fluid composition 4 and/or endothermic booster fluid 8, but before the exothermic fluid composition 10. In such embodiments, the acidic spacer fluid 6 may operate to locally reduce a pH of the areas impacted by the endothermic fluid composition. Particularly, without being limited by theory, the exothermic fluid composition may require a threshold temperature to start the exothermic reaction, the threshold temperature of which is indirectly proportional to the pH of the fluid, i.e., a lowered pH decreases the threshold temperature of activation. Accordingly, by utilizing the acidic spacer fluid 6, the exothermic fluid composition may activate upon contact with regions of the subsurface formation contacted with the acidic spacer fluid.

For example, and in embodiments, when the pH of the exothermic fluid composition 10 is at 6 pH, the reaction activation temperature of the thermochemical component may be approximately 125° F. In another example, when the pH of the exothermic fluid composition 10 is at 7 pH, the reaction activation temperature of the thermochemical component may be approximately 137° F. In another example, when the pH of the exothermic fluid composition 10 is at 8 pH, the reaction activation temperature of the thermochemical component may be approximately 150° F. In another example, when the pH of the exothermic fluid composition 10 is at 9 pH, the reaction activation temperature of the thermochemical component may be approximately 187° F. In another example, when the pH of the exothermic fluid composition 10 is at 10 pH, the reaction activation temperature of the thermochemical component may be approximately 325° F. In embodiments, lower pH's of the exothermic fluid composition 10 may require lower reaction activation temperatures for the thermochemical component, and vice versa.

Now referring back to FIG. 1, the system 100 may comprise a subsurface formation 201, a wellbore 202, and a wellhead 210. Moreover, while the wellbore 202 and the subsurface formation 201 are shown to be vertical, the wellbore 202 in at least some embodiments may at least partially horizontal, i.e., the wellbore 202 may be part of a horizontally drilled well, as may be understood in the art. The subsurface formation 201 may comprise an unconventional reservoir, such as a shale. However, the subsurface formation 201 may also be a conventional reservoir, such as a sandstone.

Figure 2:
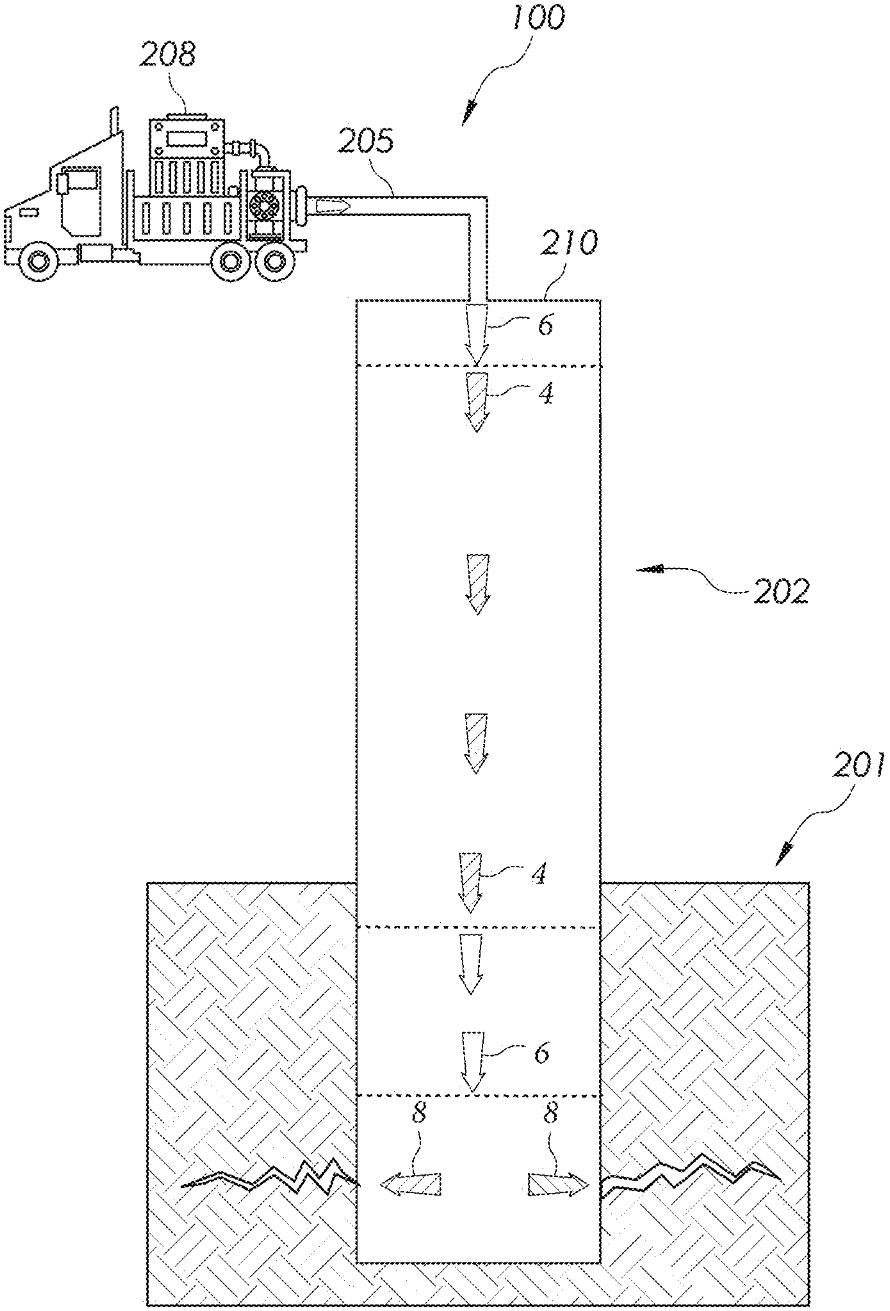
FIG. 2 illustrates a progression of the system of FIG. 1, according to embodiments herein, particularly the introduction of the endothermic booster fluid being injected ahead of the endothermic fluid composition.
Figure 3:
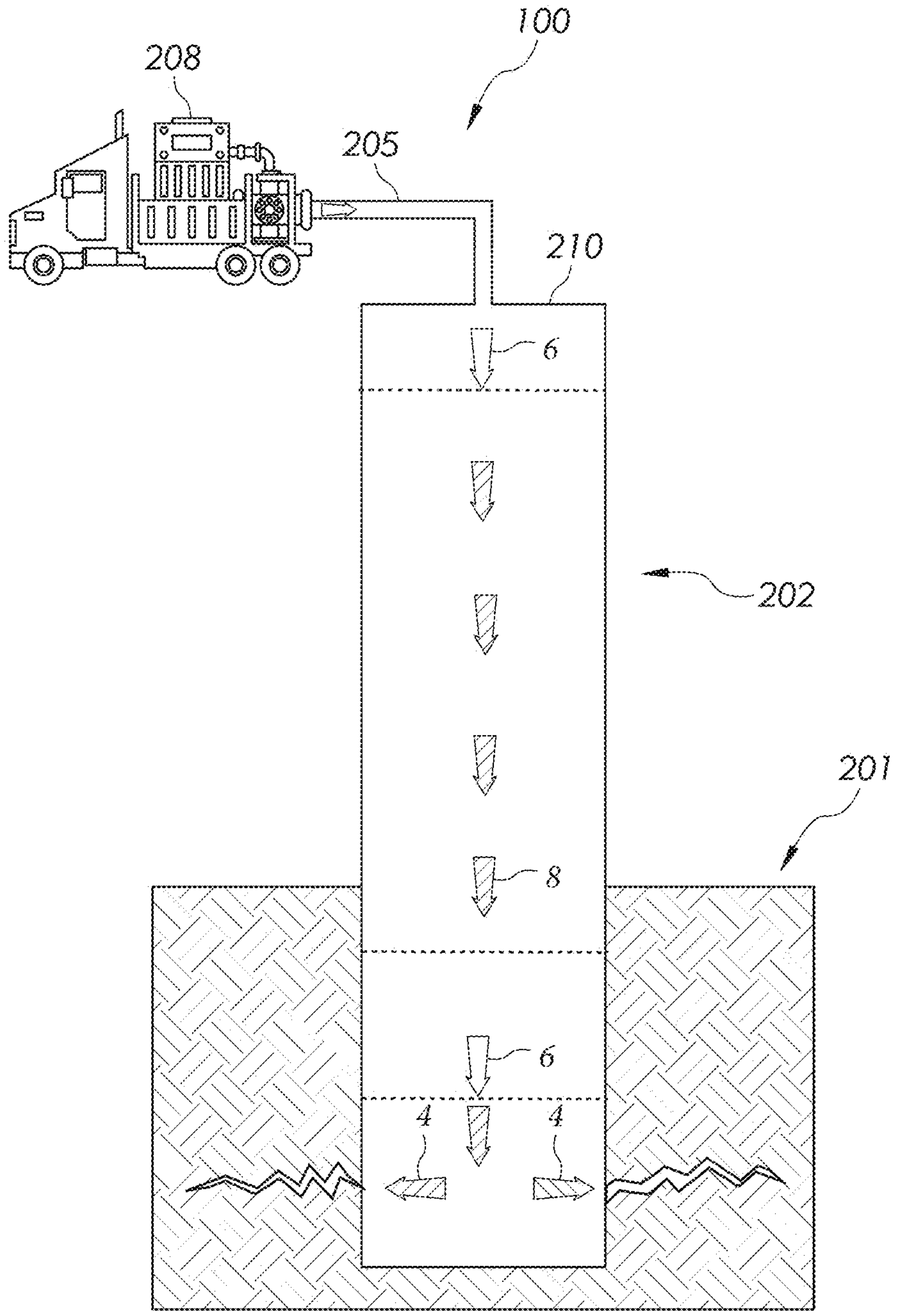
FIG. 3 illustrates another progression of the system of FIGS. 1-2, according to embodiments herein, particularly illustrating the introduction of the endothermic booster fluid being injected behind the endothermic fluid composition.
Figure 4:
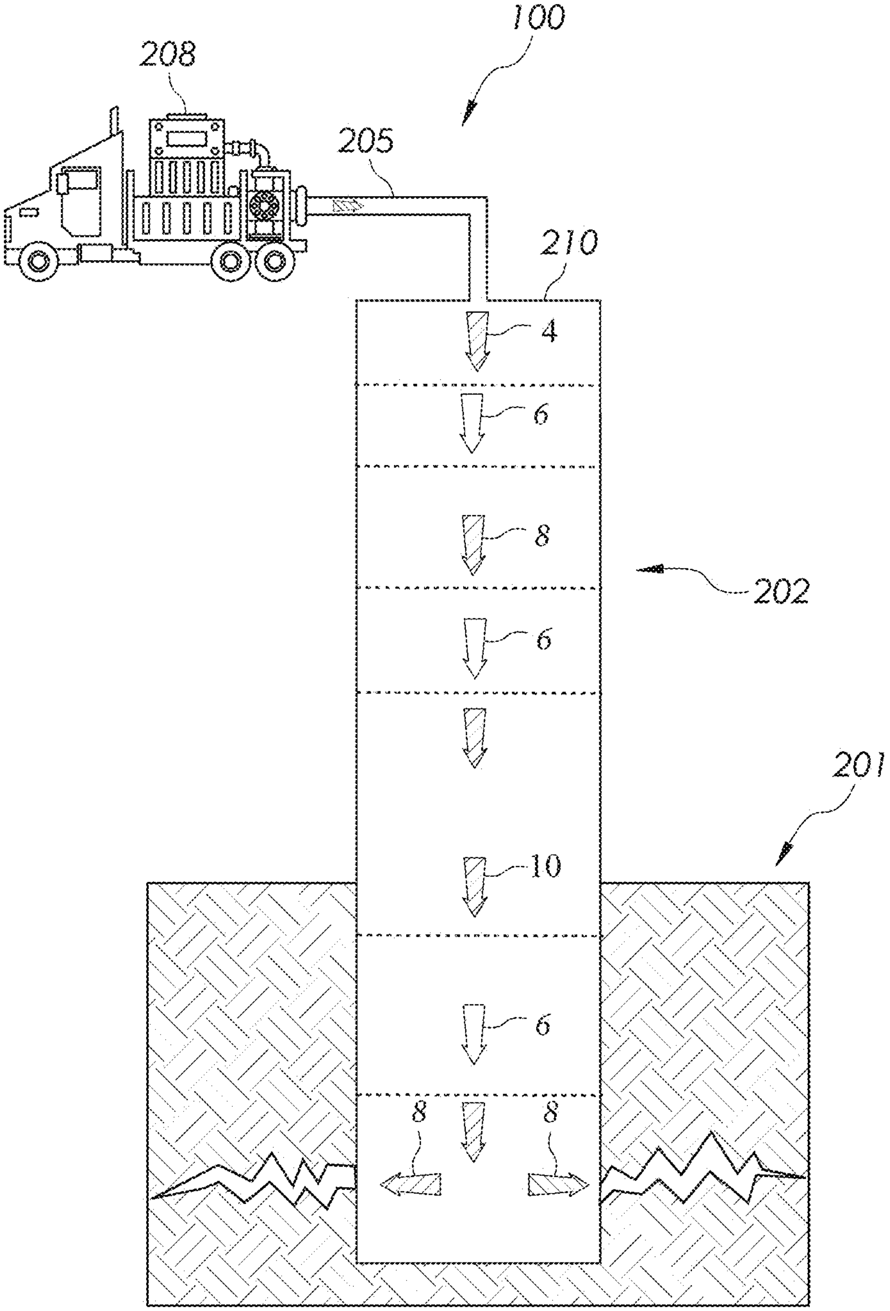
FIG. 4 illustrates another progression of the system of FIGS. 1-3, according to embodiments herein, particularly illustrating the introduction of the exothermic fluid composition following the endothermic fluid composition.
Figure 5:
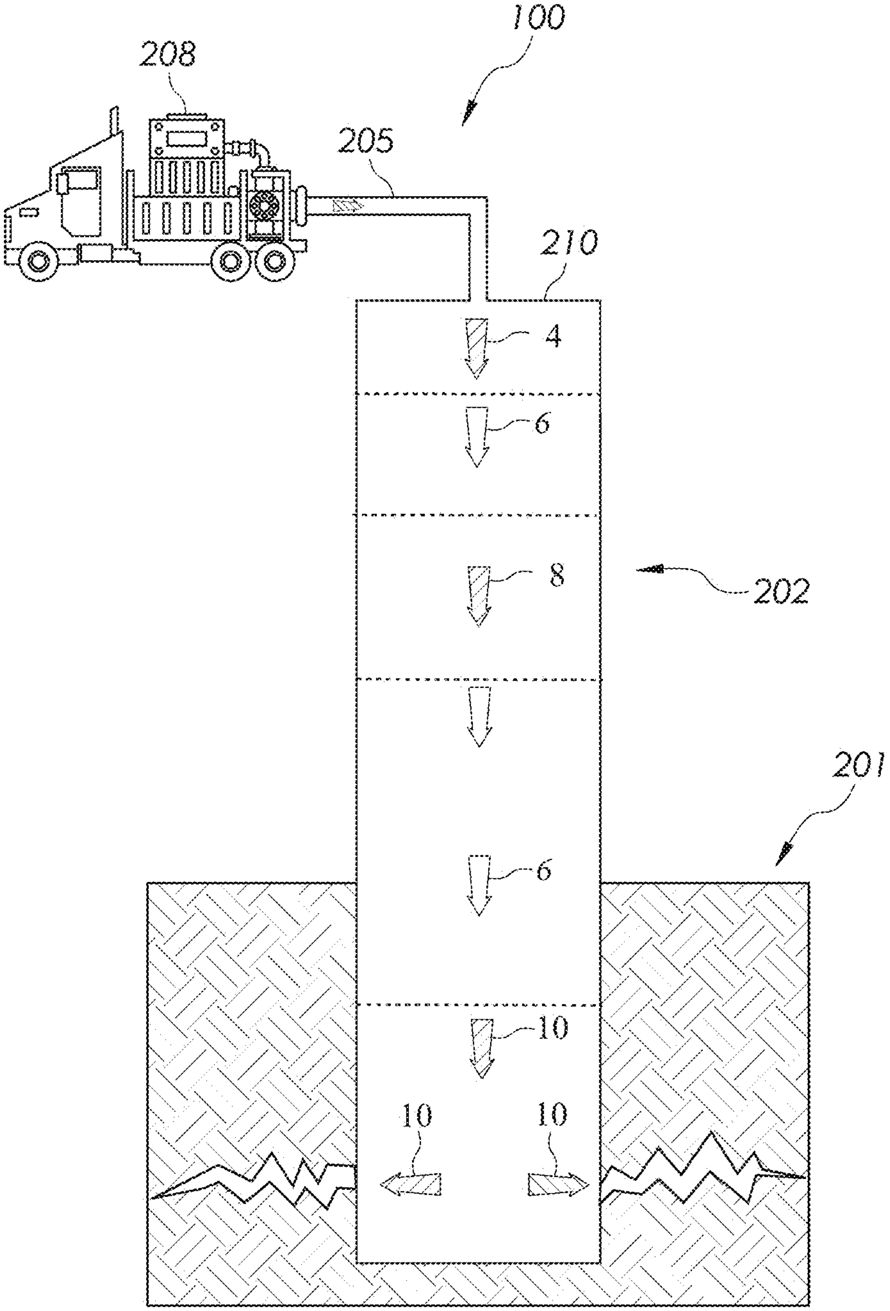
FIG. 5 illustrates another progression of the system of FIGS. 1-4, according to embodiments herein, particularly illustrating a repetition of the stage of FIG. 1.
Figure 6:
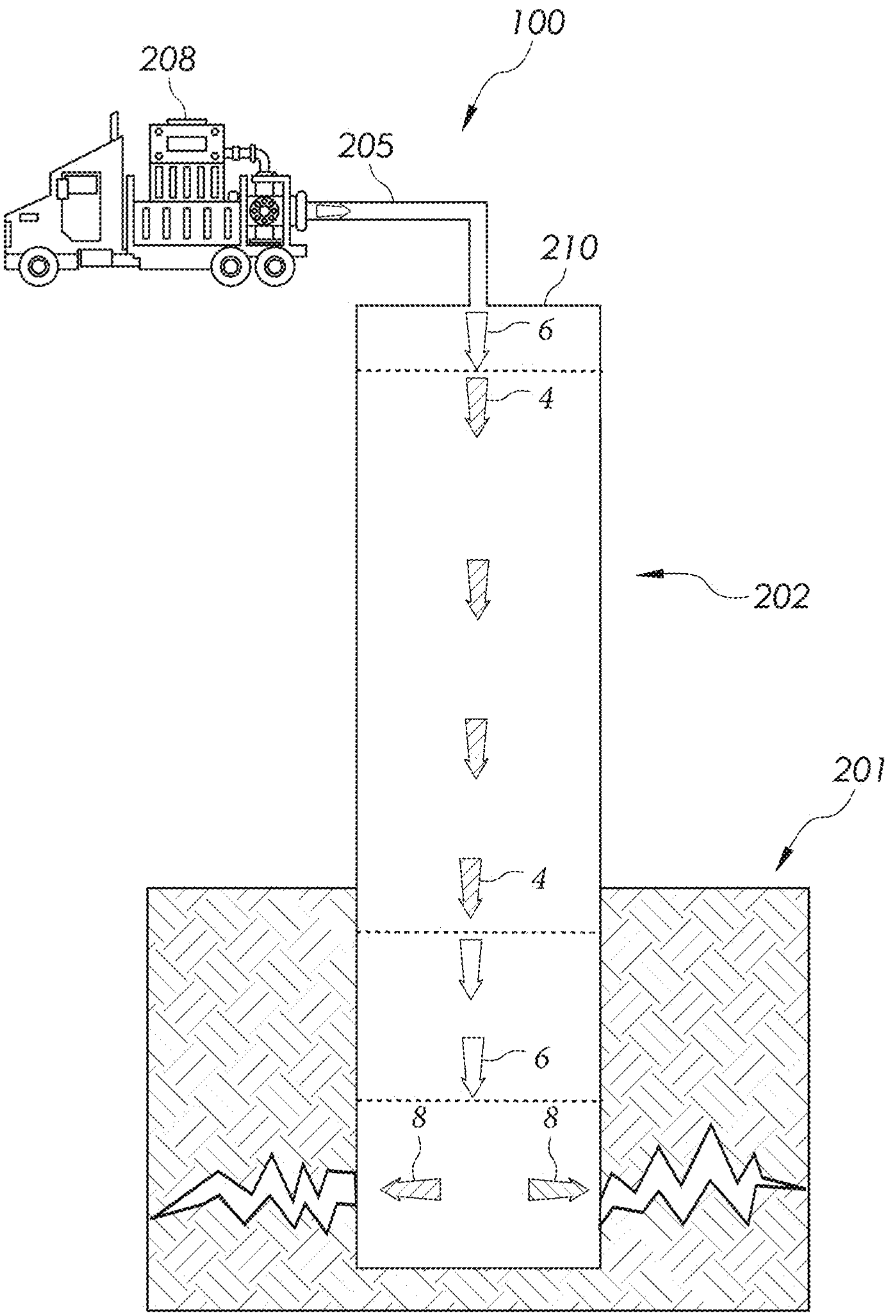
FIG. 6 illustrates another progression of the system of FIGS. 1-5, according to embodiments herein, particularly illustrating a repetition of the stage of FIG. 2.

As shown in FIGS. 1-3, the wellbore 202 may be fluidly connected to the subsurface formation 201, such as by the wellbore 202 wall. The wellbore 202 may also be fluidly connected to the wellhead 210 positioned at the surface by a fluid conduit from the surface to a termination point in the wellbore 202 proximal the subsurface formation 201, such that fluid injected into the wellbore 202 is primarily exposed to the subsurface formation 201.

As previously stated, the systems herein may be utilized to thermally shock the subsurface formation 201, such as alternatively introducing the endothermic fluid composition 4 and the exothermic fluid composition 10 to the subsurface formation 201. As previously stated, the ammonium chloride may spontaneously react with water and/or the hydroxide compound from the endothermic booster fluid 8 to form ammonia gas in an endothermic reaction.

However, by appropriately cooling the ammonium chloride or by encapsulating the ammonium chloride, reactions with water and/or the hydroxide compound may be delayed until reaching the subsurface formation and elevated temperature of the same, as explained in further detail herein.

In embodiments including the polymers and crosslinkers, the endothermic fluid composition 4 may be transported to the wellhead 210 as a completed product, i.e., already crosslinked. However, in at least some embodiments, the endothermic fluid composition 4 may instead be delivered as its constituent components. Accordingly, in at least some embodiments, some level of preparation may be required prior to introducing the endothermic fluid composition 4 when the polymer and crosslinker(s) are utilized. For example, embodiments herein may include a method of making the endothermic fluid composition, which may in turn be encompassed in the method of thermally shocking the subsurface formation 201.

The method of making may comprise adding the polymer and the delayed crosslinker to the aqueous solution. The method may then comprise adding the ammonium chloride to the aqueous solution, thereby decreasing a temperature of the aqueous solution by the reaction of the ammonium chloride with the aqueous solution. However, the method may further comprise continuing to add the ammonium chloride to the aqueous solution after the temperature of the aqueous solution stabilizes, thereby forming an over-saturated endothermic fluid. The method may then comprise adding the surface crosslinker to the aqueous solution, thereby forming the crosslinked aqueous solution and thereby the crosslinked endothermic fluid composition 4.

As previously stated, embodiments herein may be directed to thermally shocking a subsurface formation 201, such as by alternatively introducing the endothermic fluid composition 4 and the exothermic fluid composition 10. As shown in FIGS. 1-3, the system 100 may further comprise one or more fluid injection pumps 208 configured to supply the endothermic fluid composition 4 and the exothermic fluid composition 10 to the subsurface formation 201, such as through one or more injection lines 205 fluidly connected to the wellhead 210. The endothermic fluid composition 4 and the exothermic fluid composition 10 may be supplied to the subsurface formation through the same or different fluid injection pumps, and may be supplied to the one or more fluid injection pumps 208 through one or more storage vessels, each storage vessel containing one of the components of the endothermic fluid composition 4 and/or exothermic fluid composition 10, or multiple components of the endothermic fluid composition 4 and/or exothermic fluid composition 10. For example, and in embodiments, owing to the exothermic fluid composition and the endothermic fluid composition potentially comprising ammonium chloride, ammonium chloride provided to the one or more fluid injection pumps 208 for the exothermic fluid composition and the endothermic fluid composition may originate from the same container(s).

As previously stated, embodiments herein may also include methods of utilizing the endothermic fluid composition 4 and the exothermic fluid composition 10, i.e., methods of thermally shocking the subsurface formation 201. For example, and referring to FIG. The method may comprise introducing the endothermic fluid composition 4 into the subsurface formation via the wellbore. In embodiments, such as those where the endothermic fluid composition does not comprise the crosslinker(s) or encapsulation for the ammonium chloride, a temperature of the subsurface formation may activate the ammonium chloride, reacting the ammonium chloride with fluids of the subsurface formation, thereby decreasing the temperature of the subsurface formation, producing ammonia, and thermally shocking the subsurface formation, thereby inducing one or more fractures in the subsurface formation.

However, where the endothermic fluid composition comprises the polymer and the surface crosslinker, the temperature of the subsurface formation may instead break a surface crosslink of the endothermic fluid composition and exposes the ammonium chloride, wherein the temperature of the subsurface formation may similarly activate the ammonium chloride, reacting the ammonium chloride with fluids of the subsurface formation.

Further yet, where the endothermic fluid composition comprises the polymer, the surface crosslinker, and the delayed crosslinker, the temperature of the subsurface formation may instead break a surface crosslink of the endothermic fluid composition and exposes the delayed crosslinker. The method may then comprise crosslinking the endothermic fluid composition with the delayed crosslinker and introducing the endothermic fluid composition further into the subsurface formation, wherein the temperature of the subsurface formation breaks a delayed crosslink of the endothermic fluid composition and exposes the ammonium chloride. Accordingly, the method may then comprise reacting the ammonium chloride that has been exposed with fluids of the subsurface formation, thereby decreasing a temperature of the subsurface formation and producing ammonia. Accordingly, the method may then comprise thermally shocking the subsurface formation via the decreased temperature and produced ammonia, thereby inducing one or more fractures in the subsurface formation.

As previously stated, reaction of the ammonium chloride with the hydroxide-containing compound may be preferable to water due to the increased endothermic effect as well as increased ammonia. Accordingly, the method may further comprise introducing the endothermic booster fluid 8 into the wellbore 202 before or after introducing the endothermic fluid composition 4. The method may then comprise reacting the ammonium chloride with the sodium hydroxide of the endothermic booster fluid 8, thereby further decreasing a temperature of the subsurface formation and producing additional ammonia; and thermally shocking the subsurface formation 201 via the decreased temperature and ammonia, thereby inducing one or more additional fractures in the subsurface formation 201.

However, as previously stated, ammonium chloride and the hydroxide-containing compound may spontaneously react upon contact. Further, the hydroxide-containing compound, as a base, may operate to reduce the pH of the endothermic fluid composition 4, such that the pH-dependent crosslink of the endothermic fluid composition 4 may be disturbed and/or broken. Accordingly, it may be desired to segregate the ammonium chloride from the hydroxide-containing compound, and thereby the endothermic fluid composition 4 from the endothermic booster fluid 8 until the endothermic fluid composition 4 is exposed to the subsurface formation 201. Consequently, in at least some embodiments, the method may further comprise introducing the spacer fluid 6 into the wellbore 202 between introducing the endothermic booster fluid 8 and the endothermic fluid composition 4.

As previously stated, the endothermic fluid composition 4 may be alternatively introduced with the exothermic fluid composition 10. Accordingly, referring to FIGS. 1-5, the method may initially comprise introducing the exothermic fluid composition 10 before introducing the endothermic fluid composition 4. Without being limited by theory, introducing the exothermic fluid composition before the endothermic fluid composition is originally introduced may be desired in situations where a greater temperature gradient is desired from the wellbore to the subsurface formation. For example, in at least those embodiments of the endothermic fluid composition comprising the polymer and the crosslinker(s) or ammonium chloride encapsulation, a greater temperature gradient may operate to more rapidly degrade the encapsulating crosslinked gel and/or the encapsulation means itself, potentially allowing targeted thermal shock to regions of the subsurface formation proximal the wellbore, useful for example in unconventional reservoirs.

In embodiments introducing the exothermic fluid composition 10 before introducing the endothermic fluid composition 4, the method may comprise introducing the exothermic fluid composition 10; and reacting the ammonium-containing compound and the nitrite-containing compound of the exothermic fluid composition in the subsurface formation, thereby increasing the temperature of the subsurface formation, producing nitrogen, and inducing one or more initial fractures in the subsurface formation. Particularly, the exothermic fluid composition may be introduced before the endothermic booster fluid 8, if the endothermic booster fluid 8 is introduced prior to the endothermic fluid composition 4.

Further, as previously stated, the methods of thermally shocking herein may have a repeatable application aspect. Accordingly, the method may comprise introducing another exothermic fluid composition 10 after introducing the initial endothermic fluid composition 4. Without being limited by theory, introducing the second exothermic fluid composition 10 may have the advantage releasing nitrogen that may generate additional fractures in the subsurface formation as well as reheating the subsurface formation locally exposed to the initial endothermic fluid composition. Accordingly, the method may comprise introducing an additional exothermic fluid into the subsurface formation and reacting the ammonium-containing compound and the nitrite-containing compound of the same in the subsurface formation, thereby increasing the temperature of the subsurface formation, producing nitrogen, and inducing one or more additional fractures in the subsurface formation. In embodiments, the additional exothermic fluid composition may be introduced after the endothermic booster fluid 8, if the endothermic booster fluid 8 is introduced after the initial endothermic fluid composition 4.

As previously stated, in at least some embodiments a spacer fluid 6 may be utilized in between any of the endothermic fluid composition(s)', endothermic booster fluid(s)', or exothermic fluid composition(s)' introduction. Further, as previously stated, the spacer fluid 6 may be an acidic spacer fluid 6. Accordingly, the method may comprise introducing the acidic spacer fluid into the subsurface formation via the wellbore between introducing the initial endothermic fluid composition and the additional exothermic fluid composition.

After reheating the formation with the additional exothermic fluid composition, the method may then comprise introducing an additional endothermic fluid composition to again thermally shock the subsurface formation. For example, and in embodiments, the method may comprise introducing the additional endothermic fluid composition into the subsurface formation via the wellbore after introducing the additional exothermic fluid composition; reacting the ammonium chloride of the additional endothermic fluid composition with fluids of the subsurface formation, thereby decreasing the temperature of the subsurface formation, producing additional ammonia, and again thermally shocking the subsurface formation thereby inducing one or more additional fractures in the subsurface formation.

Similar to for the initial endothermic fluid composition, the method may also comprise introducing the endothermic booster fluid and/or the spacer before or after the additional endothermic fluid composition, as appropriate. The aforementioned steps (endothermic introduction, exothermic introduction, endothermic introduction, etc.) may then be repeated as necessary until the desired thermal shock and softening of the subsurface formation is achieved.

As previously stated, the methods of thermally shocking the subsurface formation 201 may reduce the compressive strength and/or Poisson's ratio of the subsurface formation 201, which may aid in future hydraulic fracturing operations. Accordingly, in at least one embodiment, the method may further comprise introducing a hydraulic fracturing composition into the subsurface formation 201 after exposing the reacted endothermic fluid to the subsurface formation 201, thereby increasing a size of the one or more fractures in the subsurface formation 201. The hydraulic fracturing composition may comprise an aqueous solution, such as any of the aqueous solutions previously described, a polymer, such as any of the polymers previously described, and/or a crosslinker, such as any of the crosslinkers previously described. The method may also comprise introducing a proppant into the subsurface formation 201, such as with the endothermic fluid compositions 4, the endothermic booster fluids 8, the spacers, the exothermic fluid compositions 10, the hydraulic fracturing composition, or combinations thereof, thereby propping open at least a portion of the one or more fractures in the subsurface formation 201.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

It is also noted that recitations herein of "at least one" component, element, etc., should not be used to create an inference that the alternative use of the articles "a" or "an" should be limited to a single component, element, etc. The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising." It is noted that the use of the terms "having" or "including", or grammatical variations thereof, in this disclosure should also be interpreted in like manner as the more commonly used open-ended preamble term "comprising".

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

Having described the subject matter of the present embodiments herein in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present embodiments including, but not limited to, embodiments defined in the appended claims. More specifically, although some aspects of the present embodiments are identified herein as preferred or particularly advantageous, it is contemplated that the present embodiments is not necessarily limited to these aspects.

What is claimed is:

1. A method of thermally shocking a subsurface formation, the method comprising:

introducing an endothermic fluid composition comprising a first aqueous solution and ammonium chloride into the subsurface formation via a wellbore fluidly connected to the subsurface formation, reacting the ammonium chloride with fluids of the subsurface formation, thereby decreasing a temperature of the subsurface formation, producing ammonia, and thermally shocking the subsurface formation, thereby inducing one or more fractures in the subsurface formation;

introducing an exothermic fluid composition comprising a second aqueous solution, an ammonium-containing compound, and a nitrite-containing compound into the subsurface formation;

reacting the ammonium-containing compound and the nitrite-containing compound in the subsurface formation, thereby increasing the temperature of the subsurface formation, producing nitrogen, and inducing one or more additional fractures in the subsurface formation;

introducing a second endothermic fluid composition comprising the first aqueous solution and the ammonium chloride into the subsurface formation via the wellbore after introducing the exothermic fluid composition;

reacting the ammonium chloride with fluids of the subsurface formation, thereby decreasing the temperature of the sub surface formation, producing additional ammonia, and again thermally shocking the sub surface formation thereby inducing one or more additional fractures in the subsurface formation; and alternating introducing of additional exothermic fluid compositions with introduction of additional endothermic fluid compositions.

2. The method of claim 1, further comprising:

introducing a second exothermic fluid composition comprising the second aqueous solution, the ammonium-containing compound, and the nitrite-containing compound into the subsurface formation prior to introducing the endothermic fluid composition; and reacting the ammonium-containing compound and the nitrite-containing compound of the second exothermic fluid composition in the subsurface formation, thereby increasing the temperature of the subsurface formation, producing nitrogen, and inducing one or more initial fractures in the subsurface formation.

3. The method of claim 1, further comprising:

introducing an endothermic booster fluid into the subsurface formation via the wellbore between introducing the endothermic fluid composition and the exothermic fluid composition or before introducing the endothermic fluid composition, the endothermic booster fluid comprising a hydroxide-containing compound and a third aqueous solution;

reacting the ammonium chloride with the hydroxide-containing compound of the endothermic booster fluid, thereby further decreasing the temperature of the subsurface formation, producing additional ammonia, and additionally thermally shocking the subsurface formation, thereby inducing one or more additional fractures in the subsurface formation.

4. The method of claim 3, wherein the hydroxide-containing compound is sodium hydroxide.

5. The method of claim 3, further comprising introducing a spacer fluid into the subsurface formation via the wellbore between introducing the endothermic booster fluid and the endothermic fluid composition.

6. The method of claim 1, further comprising introducing an acidic spacer fluid into the subsurface formation via the wellbore between introducing the endothermic fluid composition and the exothermic fluid composition.

7. The method of claim 1, wherein:

the endothermic fluid composition further comprises a polymer and a surface crosslinker;

the surface crosslinker comprises borate, titanate, or aluminate; and the surface crosslinker crosslinks the polymer, thereby encapsulating the ammonium chloride in the endothermic fluid composition via the polymer and the surface crosslinker.

8. The method of claim 7, wherein the polymer is guar.

9. The method of claim 7, wherein:

the endothermic fluid composition further comprises a delayed crosslinker;

the delayed crosslinker comprises an organozirconium compound; and the delayed crosslinker is also encapsulated in the endothermic fluid composition via the polymer and surface crosslinker.

10. The method of claim 9, wherein the organozirconium compound comprises a zirconium polycarboxylate, a zirconium polyethyleneamine, a zirconium polyethyleneimine, a zirconium polyhydrazone, or combinations thereof.

11. The method of claim 9, wherein the endothermic fluid composition further comprises a persulfate breaker, a peroxide breaker, or both.

12. The method of claim 7, wherein:

the endothermic fluid composition is over-saturated with ammonium chloride, such that the endothermic fluid composition comprises dissolved ammonium chloride in the aqueous solution and solid ammonium chloride suspended in the aqueous solution; and the solid ammonium chloride is encapsulated in the endothermic fluid composition via the polymer and surface crosslinker.

13. The method of claim 1, wherein the ammonium chloride is encapsulated.

14. The method of claim 1, wherein the exothermic fluid composition further comprises a buffer comprising acetic acid, citric acid, monopotassium phosphate, or N-cyclohexyl-2-aminoethanesulfonic acid.

15. The method of claim 1, wherein:

the nitrite-containing compound comprises sodium nitrite; and the ammonium-containing compound comprises ammonium chloride.

16. The method of claim 1, further comprising introducing a hydraulic fracturing composition into the subsurface formation after reacting the ammonium-containing compound and the nitrite-containing compound, thereby increasing a size of the one or more fractures in the subsurface formation.

17. The method of claim 16, further comprising introducing a proppant into the subsurface formation with the hydraulic fracturing composition, thereby propping open at least a portion of the one or more fractures in the subsurface formation.

18. A method of thermally shocking a subsurface formation, the method comprising:

introducing an exothermic fluid composition comprising an aqueous solution, an ammonium-containing compound, and a nitrite-containing compound into the subsurface formation via a wellbore fluidly connected to the subsurface formation;

reacting the ammonium-containing compound and the nitrite-containing compound of the exothermic fluid composition in the subsurface formation, thereby increasing a temperature of the subsurface formation, producing nitrogen, and inducing one or more fractures in the subsurface formation;

introducing an endothermic fluid composition comprising a second aqueous solution and ammonium chloride into the subsurface formation via the wellbore;

reacting the ammonium chloride with fluids of the subsurface formation, thereby decreasing the temperature of the subsurface formation, producing ammonia, and thermally shocking the subsurface formation, thereby inducing one or more additional fractures in the subsurface formation;

introducing a second exothermic fluid composition comprising the aqueous solution, the ammonium-containing compound, and the nitrite-containing compound into the subsurface formation;

reacting the ammonium-containing compound and the nitrite-containing compound of the second exothermic fluid composition in the subsurface formation, thereby again increasing a temperature of the subsurface formation, producing additional nitrogen, and inducing one or more additional fractures in the subsurface formation;

introducing a second endothermic fluid composition comprising the second aqueous solution and the ammonium chloride into the subsurface formation via the wellbore; and reacting the ammonium chloride of the second endothermic fluid composition with fluids of the subsurface formation, thereby again decreasing the temperature of the subsurface formation, producing additional ammonia, and again thermally shocking the subsurface formation thereby inducing one or more additional fractures in the subsurface formation;

alternating introduction of additional exothermic fluid compositions with introduction of additional endothermic fluid compositions.

19. The method of claim 18, further comprising introducing a hydraulic fracturing composition comprising a proppant into the subsurface formation after reacting the ammonium chloride of the second endothermic fluid composition, thereby increasing a size of the one or more fractures in the subsurface formation.

* * * * *